US012573329B2

(12) United States Patent
Chen et al.

(10) Patent No.: US 12,573,329 B2
(45) Date of Patent: Mar. 10, 2026

(54) SOURCE DRIVING CHIP AND DISPLAY MODULE

(71) Applicant: TCL CHINA STAR OPTOELECTRONICS TECHNOLOGY CO., LTD., Shenzhen (CN)

(72) Inventors: Weifeng Chen, Shenzhen (CN); Qingsheng Lan, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/964,414

(22) Filed: Nov. 30, 2024

(65) Prior Publication Data

US 2025/0372021 A1 Dec. 4, 2025

(30) Foreign Application Priority Data

Jun. 4, 2024 (CN) ........................ 202410722428.0

(51) Int. Cl.
*G09G 3/20* (2006.01)

(52) U.S. Cl.
CPC ... *G09G 3/2092* (2013.01); *G09G 2310/0275* (2013.01); *G09G 2310/08* (2013.01); *G09G 2370/16* (2013.01)

(58) Field of Classification Search
None
See application file for complete search history.

(56) References Cited

U.S. PATENT DOCUMENTS

2022/0215805 A1* 7/2022 Im ........................ G09G 3/3275

* cited by examiner

*Primary Examiner* — Christopher J Kohlman
(74) *Attorney, Agent, or Firm* — PV IP PC; Wei Te Chung

(57) ABSTRACT

A source driving chip and a display module are provided. The source driving chip is electrically connected between a timing controller and a display panel in the display module, an equalizer in the source driving chip is configured to obtain a to-be-processed signal output from the timing controller and filter the to-be-processed signal according to a cut-off frequency to output a target signal in the to-be-processed signal, the source driving chip is configured to drive the display panel for display according to the target signal, and the equalizer includes an adjustable unit for adjusting the cut-off frequency, thereby reducing interference between a target signal output from the source driving chip and a current external signal, and improving reliability of mutual transmission.

20 Claims, 4 Drawing Sheets

SOURCE DRIVING CHIP AND DISPLAY MODULE

CROSS-REFERENCE TO RELATED APPLICATION

This application claims priority to and the benefit of Chinese Patent Application No. 202410722428.0, filed on Jun. 4, 2024, the entire content of which is hereby incorporated by reference.

TECHNICAL FIELD

The present disclosure relates to the field of display technologies, and in particular, to manufacturing of a display device, and specifically to a source driving chip and a display module.

BACKGROUND

A wireless network communication device such as a wireless router or an optical modem can implement sharing of Internet resources, and be an indispensable device in a home.

However, in a general use case of the wireless network communication device, a distance of the wireless router from a display device such as a television set is closer, and an overlapping portion between an operating frequency band of a source driving chip in the display device and an operating frequency band of the wireless router is larger, which causes a signal transmitted by the wireless router to interfere with a signal transmitted by the source driving chip and results in an abnormal display screen of the display device.

Therefore, the above interference presented between the conventional display device and the wireless network communication device need to be solved urgently.

SUMMARY

An object of the present disclosure is to provide a source driving chip and a display module to reduce interference between the conventional display device and the wireless network communication device.

Embodiments of the present disclosure provide a source driving chip for a display module, where the display module includes a display panel and a timing controller, the source driving chip is electrically connected between the timing controller and the display panel, and the source driving chip includes: an equalizer for obtaining a to-be-processed signal output from the timing controller and filtering the to-be-processed signal according to a cut-off frequency to output a target signal in the to-be-processed signal, where the source driving chip is configured to drive the display panel for display according to the target signal; where the equalizer includes an adjustable unit for adjusting the cutoff frequency.

In some embodiments of the present disclosure, the equalizer further includes a base unit electrically connected to the adjustable unit and including at least one base resistor and at least one base capacitor; and the adjustable unit includes at least one adjustable resistor connected in series or parallel with the base resistor, and at least one adjustable capacitor connected in series or parallel with the base capacitor.

In some embodiments of the present disclosure, the adjustable resistor is connected in series with the base resistor and includes a plurality of sub-adjustable resistors connected in series, or the adjustable resistor is connected in parallel with the base resistor and includes a plurality of sub-adjustable resistors connected in parallel; and the adjustable capacitor is connected in series with the base capacitor and includes a plurality of sub-adjustable capacitors connected in series, or the adjustable capacitor is connected in parallel with the base capacitor and includes a plurality of sub-adjustable capacitors connected in parallel.

In some embodiments of the present disclosure, the adjustable resistor is connected in parallel with the base resistor and includes a plurality of resistor branches connected in parallel, where each of the resistor branches includes a sub-constant value resistor and a sub-resistor switch connected in series, and the sub-resistor switch is configured to control the sub-constant value resistor to be electrically connected to or disconnected from the base resistor; and the adjustable capacitor is connected in parallel with the base capacitor and includes a plurality of capacitor branches connected in parallel, where each of the capacitor branches includes a sub-constant value capacitor and a sub-capacitor switch connected in series, and the sub-capacitor switch is configured to control the sub-constant value capacitor to be electrically connected to or disconnected from the base capacitor.

In some embodiments of the present disclosure, the source driving chip may further include: a logic circuit electrically connected to the adjustable unit of the equalizer and configured to adjust the cutoff frequency by adjusting at least one of a resistance value of the adjustable resistor and a capacitance value of the adjustable capacitor to enable the equalizer to generate the target signal.

In some embodiments of the present disclosure, the logic circuit is configured to generate a plurality of control signals, where each of the control signals is configured to control corresponding one of sub-resistor switches or corresponding one of the sub-capacitor switches to be turned on or turned off to control the sub-constant resistor corresponding to the corresponding sub-resistor switch to be electrically connected to or disconnected from the base resistor corresponding to the corresponding sub-resistor switch or to control the sub-constant capacitor corresponding to the corresponding sub-capacitor switch to be electrically connected to or disconnected from the base capacitor corresponding to the corresponding sub-capacitor switch.

In some embodiments of the present disclosure, one terminal of the base resistor is loaded with a high voltage signal, another terminal of the base resistor is electrically connected to one terminal of the base capacitor, and another terminal of the base capacitor is grounded.

In some embodiments of the present disclosure, the base unit includes two base resistors and two base capacitors, where each of the base resistors is connected in series to corresponding one of the base capacitors; the equalizer further includes: a negative feedback resistor; a first transistor, where a gate of the first transistor is configured as a positive input terminal, one of a source and a drain of the first transistor is electrically connected to a base capacitor and a base resistor corresponding to the base capacitor and configured as a negative output terminal, and another of the source and the drain of the first transistor is electrically connected to one terminal of the negative feedback resistor; and a second transistor, where a gate of the second transistor is configured as a negative input terminal, one of a source and a drain of the second transistor is electrically connected to another base capacitor and another base resistor corresponding to the another base capacitor and configured as a positive output terminal, and another of the source and the drain of the second transistor is electrically connected to another terminal of the negative feedback resistor; when the polarity of the to-be-processed signal is positive, the to-be-processed signal is input to the positive input terminal, and the target signal is output from the positive output terminal; and when the polarity of the to-be-processed signal is negative, the to-be-processed signal is input to the negative input terminal, and the target signal is output from the negative output terminal.

In some embodiments of the present disclosure, the equalizer is a band-pass filter and the cut-off frequency includes at least an upper cut-off frequency of the band-pass filter.

The embodiments of the present disclosure further provide a display module, including: a display panel; a timing controller for outputting a to-be-processed signal; and a source driving chip electrically connected between the timing controller and the display panel and including an equalizer, where the equalizer is configured to obtain a to-be-processed signal output from the timing controller and filter the to-be-processed signal according to a cut-off frequency to output a target signal in the to-be-processed signal and the source driving chip is configured to drive the display panel for display according to the target signal; where the equalizer includes an adjustable unit for adjusting the cutoff frequency.

The present disclosure provides a source driving chip and a display module, where the equalizer is configured to obtain a to-be-processed signal output from the timing controller and filter the to-be-processed signal according to a cut-off frequency to output a target signal in the to-be-processed signal and the source driving chip is configured to drive the display panel for display according to the target signal, and the equalizer is provided to include an adjustable unit for adjusting the cut-off frequency. Therefore, the cut-off frequency in the equalizer can be adjusted according to a frequency band in which an external signal is located (i.e., a frequency band in which a gain is relatively large), so that a frequency band in which the target signal output from the equalizer is located (a frequency band in which a gain is relatively large) and a frequency band in which a current external signal is located may overlap less, and even not overlap, thereby reducing interference between the target signal output from the source driving chip and the current external signal, and improving reliability of mutual transmission.

BRIEF DESCRIPTION OF THE DRAWINGS

The present disclosure is further illustrated below by referring to the accompanying drawings. It should be noted that the accompanying drawings in the following description are merely intended to explain some embodiments of the present disclosure. A person skilled in the art may still obtain other drawings from these accompanying drawings without creative efforts.

DETAILED DESCRIPTION

Figure 1:
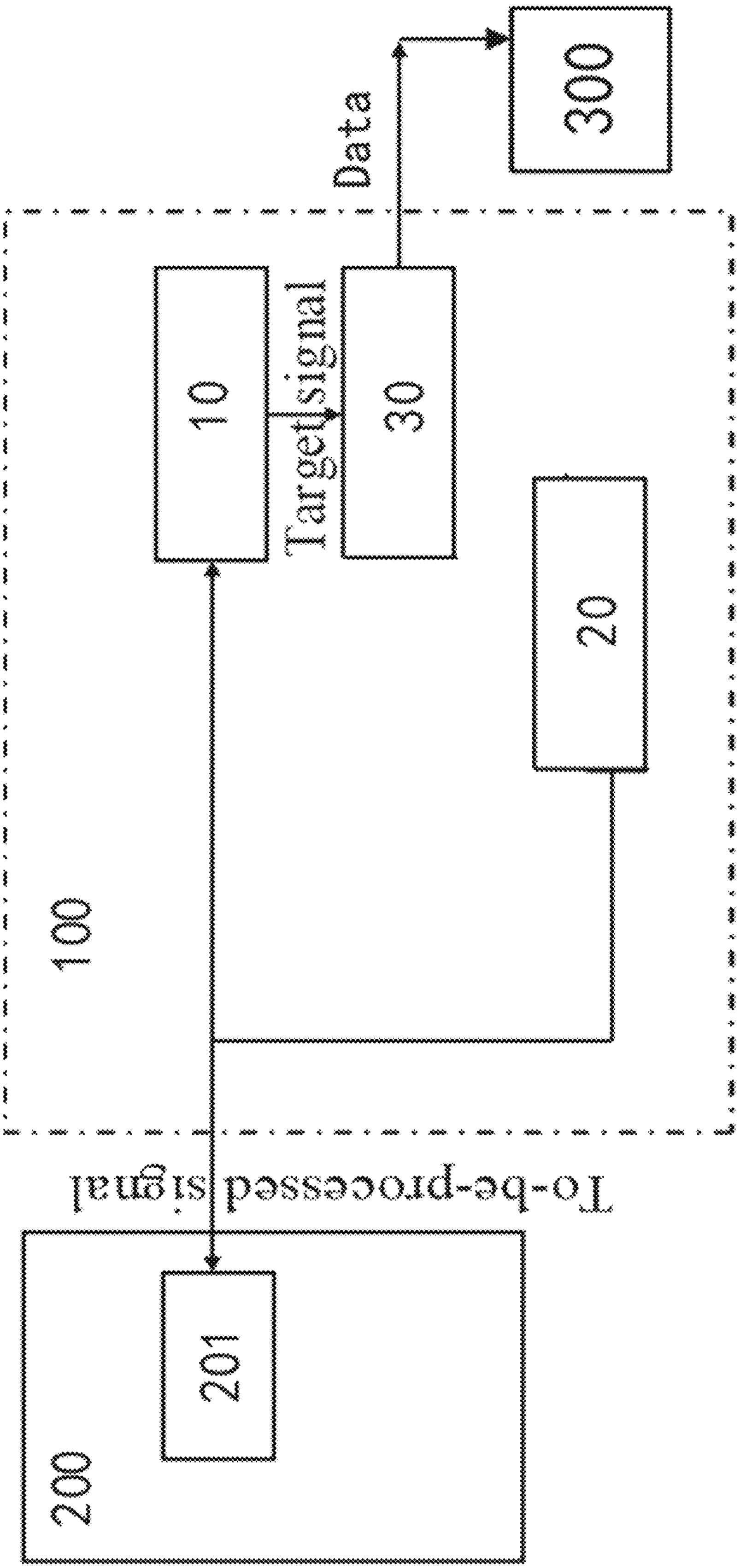
FIG. 1 is a block diagram of a display module according to some embodiments of the present disclosure.

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Any ordinarily skilled person in the technical field of the present disclosure could still obtain other accompanying drawings without use laborious invention based on the present accompanying drawings.

In the description of the present disclosure, the term "first", "second", or the like are for illustrative purposes only and are not to be construed as indicating or imposing a relative importance or implicitly indicating the number of technical features indicated. Thus, a feature that limited by "first", "second" may expressly or implicitly include at least one of the features. In addition, it should be noted that the drawings provide a structure which is relatively close to the present disclosure and omits some details which are not very relevant to the present disclosure, so as to simplify the drawings and make the present disclosure point clear, rather than indicating that the apparatus in practice is the same as that in the drawings and is not intended to be a limitation of the apparatus in practice.

Referring to "embodiments" in this specification means that specific features, structures, or characteristics described in connection with the embodiments may be included in at least one embodiment of the present disclosure. The phrase "embodiments" appearing at various respective locations in the specification does not necessarily refer to a same embodiment, or is an independent or alternative embodiment that is mutually exclusive from another embodiment. It is explicitly and implicitly understood by a person skilled in the art that the embodiments described in this specification may be combined with other embodiments.

The present disclosure may provide a source driving chip applied to a display module and configured to drive the display module to display a picture. The source driving chip may include, but not limited to, the following embodiments and combinations of the following embodiments.

In some embodiments of the present disclosure, as shown in FIG. 1, the display module may include a display panel 300 and a timing controller 200. The source driving chip 100 may be electrically connected between the timing controller 200 and the display panel 300 and include an equalizer 10 for obtaining a to-be-processed signal output from the timing controller 200 and filtering the to-be-processed signal according to a cutoff frequency to output a target signal in the to-be-processed signal, and the source driving chip 100 is configured to drive the display panel 300 for display according to the target signal. The equalizer 10 may include an adjustable unit 101 for adjusting the cutoff frequency. The equalizer 10 may be understood to filter the to-be-processed signal to obtain a target signal in a frequency band.

The equalizer 10 may include a base unit (i.e., a part other than the adjustable unit 101); and the adjustable unit 101 electrically connected to the base unit and configured to determine the cutoff frequency in combination with the base unit, where the cutoff frequency may be adjusted by the adjustable unit 101. That is, the adjustable unit 101 that can adjust the above-mentioned cutoff frequency may be provided in the present embodiment on the basis that the equalizer 10 includes the basic unit. In connection with the above discussion, a parameter in the adjustable unit 101 can be reasonably adjusted according to the frequency band in which the current external signal is located to obtain an appropriate cutoff frequency.

It should be understood that the adjustable unit 101 of the equalizer 10 in the source driving chip 100 according to the present embodiment can adjust the cut-off frequency according to a frequency band in which an external signal is located (i.e., a frequency band in which a gain is relatively large), so that a frequency band in which the target signal output from the equalizer 10 is located (a frequency band in which a gain is relatively large) and a frequency band in which a current external signal is located may overlap less, and even not overlap, thereby reducing interference between the target signal output from the source driving chip 100 and the current external signal, and improving reliability of mutual transmission.

Figure 2:
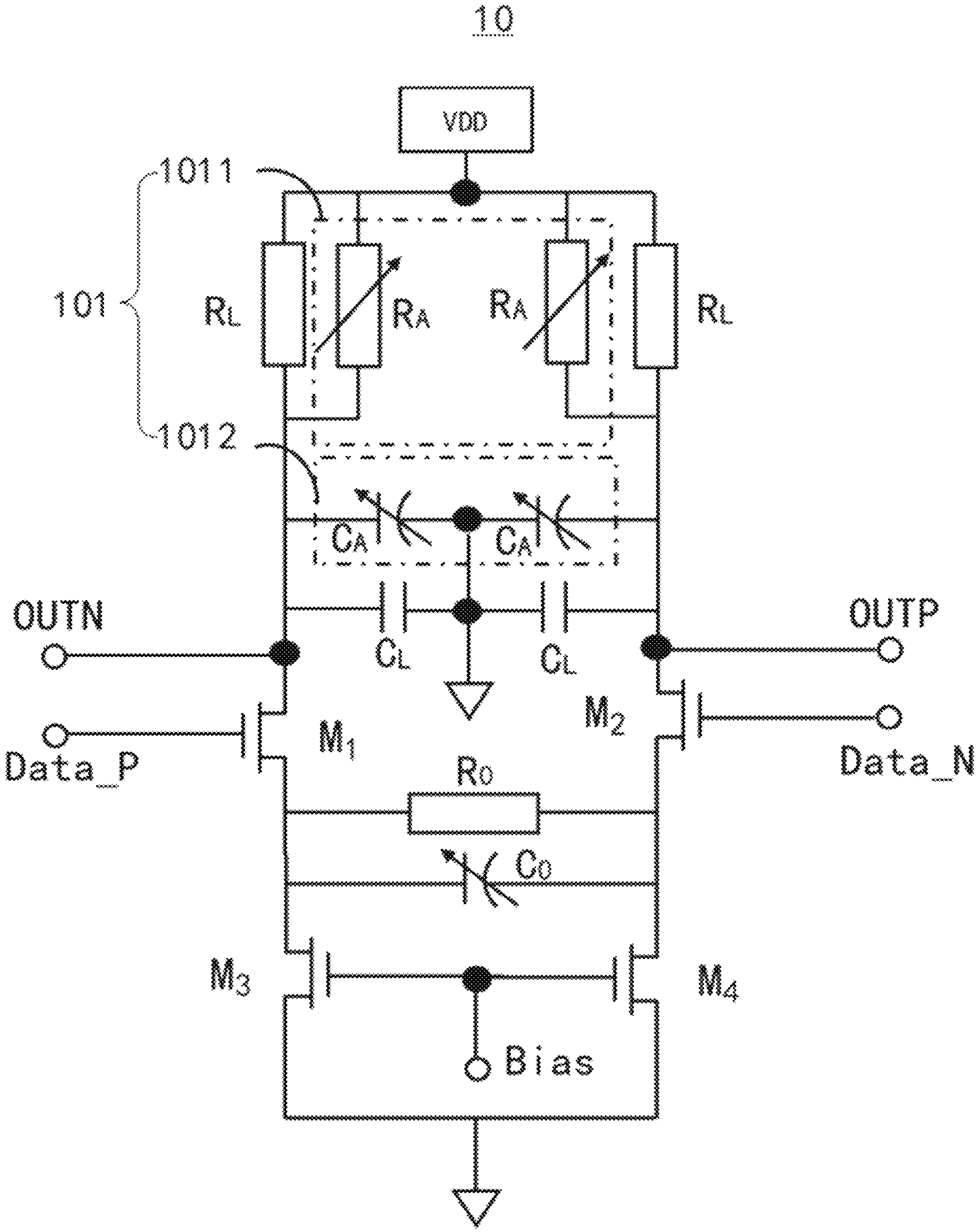
FIG. 2 is a circuit diagram of an equalizer according to some embodiments of the present disclosure.

Specifically, the base unit may include at least one base resistor $R_L$ and at least one base capacitor $C_L$, the adjustable unit 101 may include at least one adjustable resistor $R_A$ (constituting an adjustable resistor module 1011) and at least one adjustable capacitor $C_A$ (constituting an adjustable capacitor module 1012), the adjustable resistor $R_A$ is connected in series (not shown) or in parallel (as shown in FIG. 2) with the base resistor $R_L$, and the adjustable capacitor $C_A$ is connected in series (not shown) or in parallel (as shown in FIG. 2) with the base capacitor $C_L$, where only above parallel connection is shown in FIG. 2. It should be understood that, regardless of whether the adjustable resistor $R_A$ is connected in series or parallel with the base resistor $R_L$ and the adjustable capacitor $C_A$ is connected in series or parallel with the base capacitor $C_L$, if the adjustable resistor $R_A$ is adjusted, a total resistance value of the adjustable resistor $R_A$ and the base resistor $R_L$ can also be adjusted, and if the adjustable capacitor $C_A$ is adjusted, a total capacitance value of the adjustable capacitor $C_A$ and the base capacitor $C_L$ can also be adjusted. The "total resistance value" and "total capacitance value" can jointly determine the cutoff frequency, so the cutoff frequency can be adjusted by adjusting at least one of the adjustable resistance $R_A$ and the adjustable capacitor $C_A$.

Specifically, the adjustable resistor $R_A$ is connected in series (not shown) with the base resistor $R_L$ and includes a plurality of sub-adjustable resistors (not shown) connected in series, or the adjustable resistor $R_A$ is connected in parallel (not shown) with the base resistor $R_L$ and includes a plurality of sub-adjustable resistors connected in parallel (not shown, the number of sub-adjustable resistors connected in parallel is not limited herein); and the adjustable capacitor $C_A$ is connected in series (not shown) with the base capacitor $C_L$ and includes a plurality of sub-adjustable capacitors (not shown) connected in series, or the adjustable capacitor $C_A$ is connected in parallel (not shown) with the base capacitor $C_L$ and includes a plurality of sub-adjustable capacitors connected in parallel (not shown, the number of sub-adjustable capacitors connected in parallel is not limited herein).

As discussed above, regardless of whether the series or parallel connection is used, the cutoff frequency can be adjusted by adjusting at least one of the adjustable resistor $R_A$ and the adjustable capacitor $C_A$. Further, in the present embodiment, a manner of connecting the plurality of sub-adjustable resistors in the adjustable resistor $R_A$ is further defined to be the same as that of connecting the adjustable resistor $R_A$ with the base resistor $R_L$ (which both may be the series connection or the parallel connection), so that calculation of the total resistance value of the adjustable resistor $R_A$ and the base resistor $R_L$ can be facilitated. Similarly, a manner of connecting the plurality of sub-adjustable capacitors in the adjustable capacitor $C_A$ is defined to be the same as that of connecting the adjustable capacitor $C_A$ with the base capacitor $C_L$ (which both may be the series connection or the parallel connection), so that calculation of the total capacitance value of the adjustable capacitor $C_A$ and the base capacitor $C_L$ can be facilitated. Therefore, requirements of the "total resistance value" and "total capacitance value" can be calculated according to requirements of the cutoff frequency, so as to calculate requirements of the adjustable resistor $R_A$ and the adjustable capacitor $C_A$, and at least one of the plurality of adjustable resistors and the plurality of adjustable capacitors can be adjusted accordingly. Specific implementation of the sub-adjustable resistors and the sub-adjustable capacitors may be not limited herein, and can be realized by mechanical or circuit methods.

Figure 3:
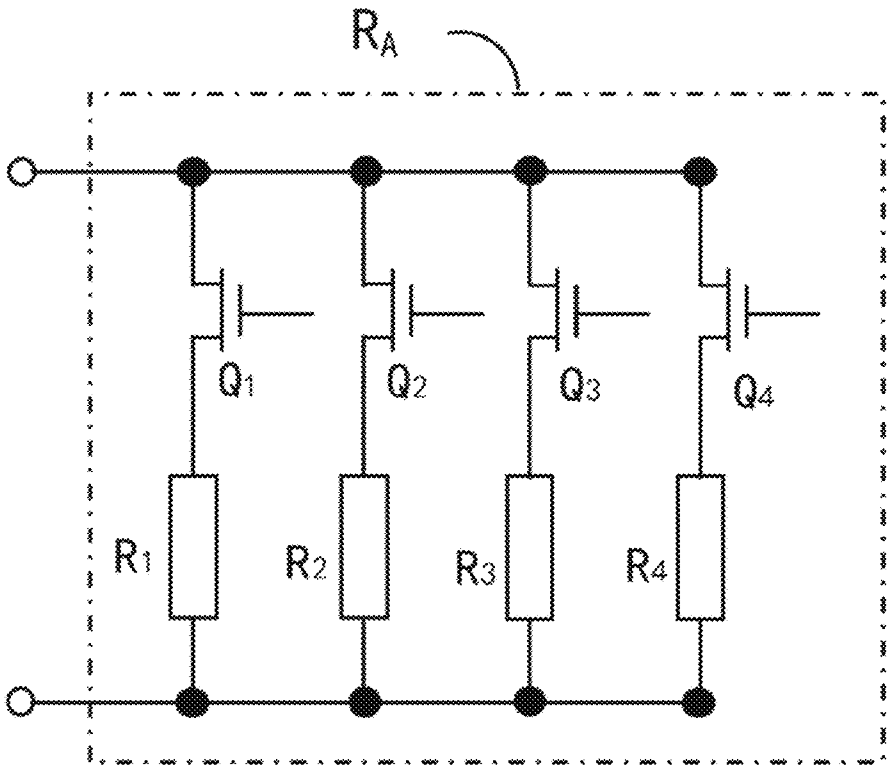
FIG. 3 is a circuit diagram of an adjustable resistor according to some embodiments of the present disclosure.
Figure 4:
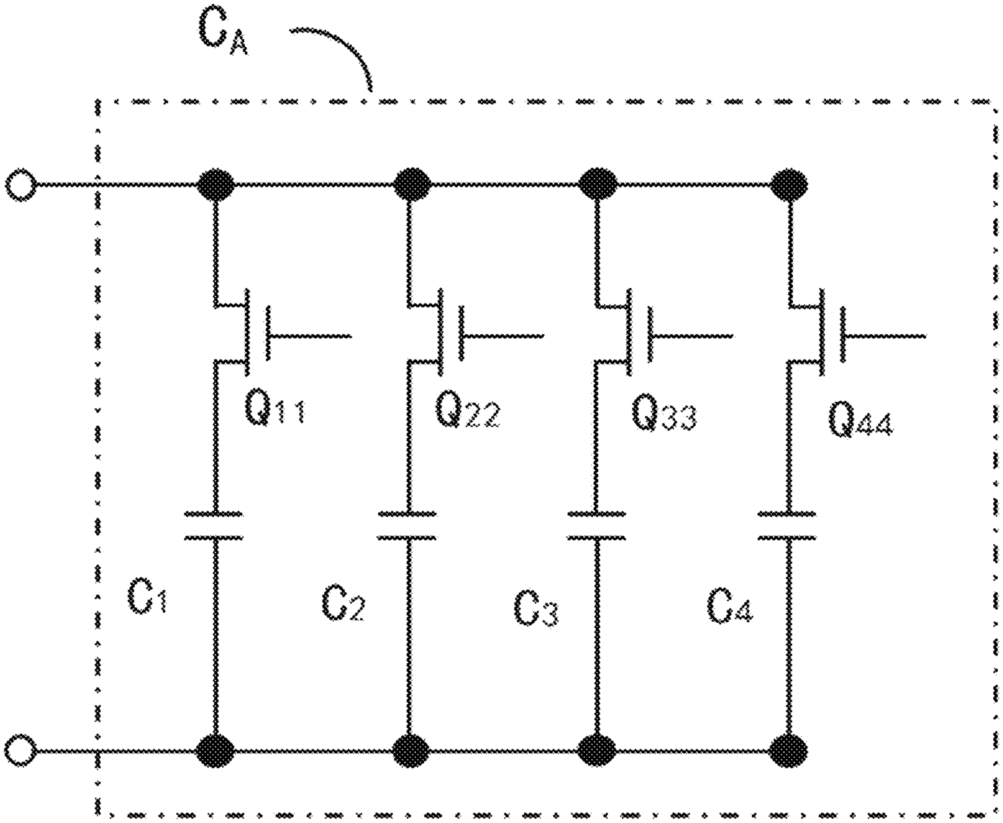
FIG. 4 is a circuit diagram of an adjustable capacitor according to an embodiment of the present disclosure.

In other embodiments of the present disclosure, as shown in FIG. 2 and FIG. 3, the adjustable resistor $R_A$ is connected in parallel with the base resistor $R_L$ and includes a plurality of resistor branches connected in parallel, where each of the resistor branches includes each of one or more sub-constant value resistors ($R_1$, $R_2$, $R_3$, or $R_4$) and corresponding one of one or more sub-resistor switches ($Q_1$, $Q_2$, $Q_3$, or $Q_4$) connected in series, and the sub-resistor switch is configured to control the sub-constant value resistor to be electrically connected to or disconnected from the base resistor $R_L$ (for example, $Q_1$ controls $R_1$ to be electrically connected to or disconnected from the $R_L$, $Q_2$ controls $R_2$ to be electrically connected to or disconnected from the $R_L$, $Q_3$ controls $R_3$ to be electrically connected to or disconnected from the $R_L$, and $Q_4$ controls $R_4$ to be electrically connected to or disconnected from the $R_L$). As shown in FIGS. 2 and 4, the adjustable capacitor $C_A$ is connected in parallel with the base capacitor $C_L$ and includes a plurality of capacitor branches connected in parallel, where each of the capacitor branches includes each of one or more sub-constant value capacitors ($C_1$, $C_2$, $C_3$, or $C_4$) and corresponding one of one or more sub-capacitor switches ($Q_{11}$, $Q_{22}$, $Q_{33}$, or $Q_{44}$) connected in series, and the sub-capacitor switch is configured to control the sub-constant value capacitor to be electrically connected to or disconnected from the base capacitor $C_L$ (for example, $Q_1$ controls $C_1$ to be electrically connected to or disconnected from $C_L$, $Q_2$ controls $C_2$ to be electrically connected to or disconnected from $C_L$, $Q_3$ controls $C_3$ to be electrically connected to or disconnected from $C_L$, and $Q_4$ controls $C_4$ to be electrically connected to or disconnected from $C_L$).

It should be understood in the present embodiment that each of the sub-constant value resistors may be connected in series with corresponding one of the sub-resistor switches and a resistance value of the adjustable resistor $R_A$ may be controlled by controlling an ON state of the sub-resistor switch to control an electrical connection state of the sub-constant value resistor and the base resistor $R_L$, so as to control a total resistance value of the adjustable resistor $R_A$ and the base resistor $R_L$, and each of the sub-constant value capacitors may be connected in series with corresponding one of the sub-capacitor switches and a capacitance value of the adjustable capacitor $C_A$ may be controlled by controlling an ON state of the sub-capacitor switch to control an electrical connection state of the sub-constant value capacitor and the base capacitor $C_L$, so as to control a total resistance value of the adjustable capacitor $C_A$ and the base capacitor $C_L$.

Further, the sub-resistor switches and the sub-capacitor switches may be provided as switching transistors, and whether each of the switching transistors is turned on or not may be realized by controlling the gate of the switching transistor. For example, only the gate of the switching transistor may be loaded with a first control signal or a second control signal. The first control signal may control the switching transistor to be turned on, so that the sub-constant value resistor is electrically connected to the base resistor $R_L$, and the second control signal may control the switching transistor to be turned off, so that the sub-constant value resistor is electrically disconnected from the base resistor $R_L$. The above transistors in the present disclosure may include at least one of Thin Film Transistors (TFT) and Metal-Oxide-Semiconductor Field-Effect Transistors (MOSFET).

Based on the above arrangements for $R_A$ and $C_A$, a resistance value of $R_A$ can be expressed as $\Sigma 1/(R_i|Q_i=1)$, i is taken throughout 1, 2, 3, and 4, and $Q_i=1$ represents that $Q_i$ is turned on, so that the resistance value of $R_i$ needs to be added for calculation of resistors connected in parallel, otherwise, the resistance value of $R_i$ is not added for the calculation of resistors connected in parallel. Similarly, a capacitance value of $C_A$ may be expressed as $\Sigma(C_i|Q_{ii}=1)$, and $Q_{ii}=1$ represents that $Q_{ii}$ is turned on, so that the capacitance value of $C_i$ needs to be added for calculation of capacitors connected parallel, otherwise, the capacitance value of $C_i$ is not added for calculation of capacitors connected parallel.

In some embodiments of the present disclosure, as shown in FIG. 2, one terminal of the base resistor $R_L$ is loaded with a high voltage signal VDD, another terminal of the base resistor $R_L$ is electrically connected to one terminal of the base capacitor $C_L$, and another terminal of the base capacitor $C_L$ is grounded. That is, the base resistor $R_L$ and the base capacitor $C_L$ are connected in series between one terminal loaded with the high voltage signal VDD and one terminal being grounded. The base resistor $R_L$ and the base capacitor $C_L$ may be referred to as output loads, and may be equivalent to an equivalent resistor of a plurality of electrically connected resistance values and an equivalent capacitor of a plurality of electrically connected capacitance values, respectively. The base resistor $R_L$ and the base capacitor $C_L$ may be determined according to parameters, numbers, and connection manners of components in the equalizer 10 that are actually connected between one terminal loaded with the high voltage signal VDD and one terminal being grounded.

Further, as shown in FIG. 2, the base unit may include two symmetrically arranged base resistors $R_L$ and two symmetrically arranged base capacitors $C_L$, where each of the base resistors $R_L$ is connected in series with corresponding one of the base capacitors $C_L$. The equalizer 10 may further include: a negative feedback capacitor $C_0$; a first transistor $M_1$, where a gate of the first transistor $M_1$ is configured as a positive input terminal (for loading a positive to-be-processed signal Data_P), one of a source and a drain of the first transistor $M_1$ is electrically connected to one base capacitor $C_L$ and one base resistor $R_L$ corresponding to the one base capacitor $C_L$ and configured as a negative output terminal OUTN (for loading a negative to-be-processed signal Data_N), and another of the source and the drain of the first transistor $M_1$ is electrically connected to one terminal of the negative feedback resistor $R_0$; and a second transistor $M_2$, where a gate of the second transistor $M_2$ is configured as a negative input terminal, one of a source and a drain of the second transistor $M_2$ is electrically connected to another base capacitor $C_L$ and another base resistor $R_L$ corresponding to the another base capacitor $C_L$ and configured as a positive output terminal OUTP (for outputting a target signal corresponding to the positive to-be-processed signal Data_P), and another of the source and the drain of the second transistor $M_2$ is electrically connected to another terminal of the negative feedback resistor $R_0$.

Specifically, in the present embodiment, two branches may be formed between one terminal loaded with the high voltage signal VDD and one terminal being grounded, and each of the branches may include one base resistor $R_L$ and one base capacitor $C_L$ connected in series, a connection node of the base resistor $R_L$ and the base capacitor $C_L$ on the left side of FIG. 2 is also connected to one of the source and the drain of the first transistor $M_1$, and a connection node of the base resistor $R_L$ and the base capacitor $C_L$ on the right side of FIG. 2 is also connected to one of the source and the drain of the second transistor $M_2$; and a negative feedback resistor $R_0$ may be provided between another of the source and the drain of the first transistor $M_1$ and another of the source and the drain of the second transistor $M_2$, and the resistance value of the negative feedback resistor $R_0$ may be adjusted (not shown) or may be not adjusted.

As can be seen from the above discussion that the positive input terminal, the negative input terminal, the positive output terminal, and the negative output terminal may be formed in the present embodiment by providing the two symmetrical base resistors $R_L$, the two symmetrical base capacitors $C_L$, and symmetrically arranged first transistor $M_1$ and second transistor $M_2$, so that the positive to-be-processed signal Data_P and the negative to-be-processed signal Data_N are respectively processed accordingly, thereby improving the reliability and flexibility of processing of the to-be-processed signal.

Specifically, when the polarity of the to-be-processed signal is positive (i.e., a positive to-be-processed signal Data_P), the to-be-processed signal is input to the positive input terminal, and the target signal is output from the positive output terminal; and when the polarity of the to-be-processed signal is negative (i.e., a negative to-be-processed signal Data_N), the to-be-processed signal is input to the negative input terminal, and the target signal is output from the negative output terminal.

Still further, as shown in FIG. 2, the base unit may further include: a negative feedback capacitor $C_0$ connected in parallel with the negative feedback resistor $R_0$, that is, both the negative feedback capacitor $C_0$ and the negative feedback resistor $R_0$ are electrically connected between the another of the source and the drain of the first transistor $M_1$ and the another of the source and the drain of the second transistor $M_2$, and a capacitance value of the negative feedback capacitor $C_0$ may be adjusted or may be not adjusted (not shown); a third transistor $M_3$, where one of the source and the drain of the third transistor $M_3$ is electrically connected to one terminal of connecting the negative feedback capacitor $C_0$ with the negative feedback resistor $R_0$; a fourth transistor $M_4$, where one of the source and the drain of the fourth transistor $M_4$ is electrically connected to another terminal of connecting the negative feedback capacitor $C_0$ with the negative feedback resistor $R_0$; where another of the source and the drain of the third transistor $M_3$ and another of the source and the drain of the fourth transistor $M_4$ are both grounded, and the gate of the third transistor $M_3$ and the gate of the fourth transistor $M_4$ are both electrically connected to a current source Bias.

Based on a manner of providing the equalizer 10 with the above circuit, when the equalizer 10 is normally powered on (both the high voltage signal VDD and the current source Bias are powered), a transfer function H(s) of the equalizer 10 may be expressed as:

$$H(s) = \frac{Z_{out}}{Z_{in}} = \frac{R_e \left\| \frac{1}{sC_e} \right.}{\frac{1}{g_m} + R_0 \left\| \frac{1}{sC_0} \right.} = \frac{g_m R_e (1 + sR_0 C_0)}{(1 + g_m R_0 + sR_0 C_0)(1 + sR_e C_e)}.$$

where, the transfer function refers to a ratio of an Laplace transform (or z transform) of a linear system response (i.e., the output) quantity to a Laplace transform (or z transform) of an excitation (i.e., the input) quantity under a zero initial condition. Therefore, for the equalizer 10, $Z_{out}$ and $Z_{in}$ may be Laplace transforms (or z transforms) of both the target signal output from the positive output terminal OUTP and the positive to-be-processed signal Data_P, respectively, or the $Z_{out}$ and $Z_{in}$ may be Laplace transforms (or z transforms) of both the target signal output from the negative output terminal OUTN and the negative to-be-processed signal Data_N, respectively. Where Re may be an equivalent resistance value of the base resistor $R_L$ and the adjustable resistor $R_A$ (for example, when $R_L$ and $R_A$ are connected in parallel, $R_e=R_L//R_A$, i.e. $(1/R_e)=(1/R_L)+(1/R_A)$), $C_e$ may be an equivalent capacitance value of the base capacitor $C_L$ and the adjustable capacitor $C_A$ (for example, when $C_L$ and $C_A$ are connected in parallel, $C_e=C_L+C_A$), $R_L$, $C_L$, $R_A$, $C_A$, $R_0$, $C_0$ are respectively referred to the above related definitions, gm is transconductance of each of all of the above transistors, and the transconductance of the first transistor $M_1$, the second transistor $M_2$, the third transistor $M_3$, and the fourth transistor $M_4$ may be considered to be the same.

As can be seen from the transfer function H(s) that the equalizer 10 may have a zero point $\omega_z$ (a point where the system transfer function is zero, i.e., the value of s when the molecule of the transfer function H(s) is zero) and two poles $\omega_{p1}$ and $\omega_{p2}$ (points where the system transfer function is infinity, i.e., the value of s when the denominator of the transfer function H(s) is zero), where $|\omega_z|=1/R_0C_0$, $|\omega_{p1}|=(1+g_mR_0)/R_0C_0$, $|\omega_{p2}|=1/R_eC_e$, so that the negative feedback capacitor $C_0$ and the negative feedback resistor $R_0$ determine positions of the zero point $\omega_z$ and one pole $\omega_{p1}$, while the base capacitor $C_L$ and the base resistor $R_L$ determine a position of another pole $\omega_{p2}$.

Figure 5:
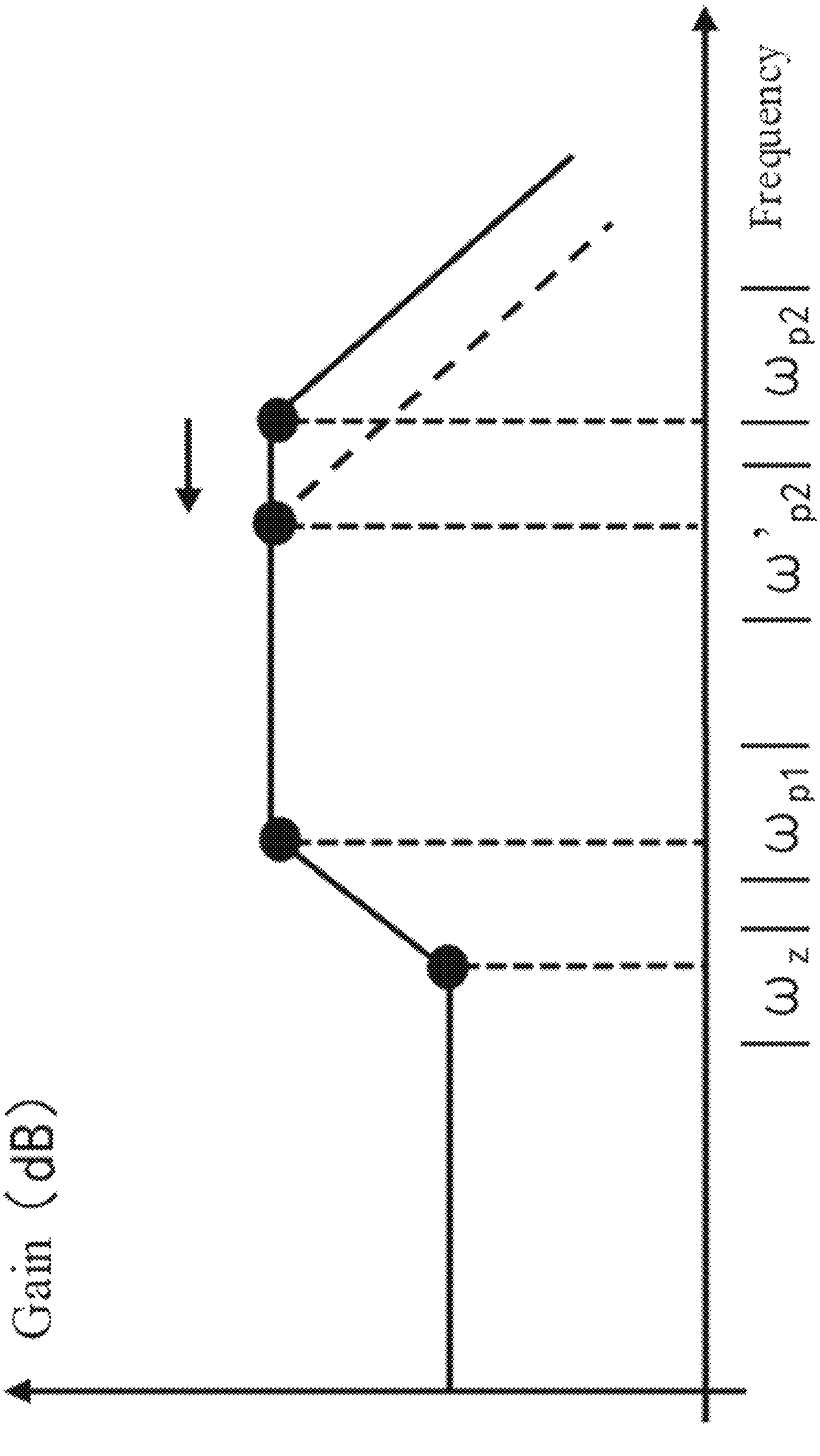
FIG. 5 is a frequency response curve of an equalizer according to some embodiments of the present disclosure.

As shown in FIG. 5, the frequency response curve of the equalizer 10 may represent the gain degree of the equalizer 10 for signals of different frequencies, the abscissa represents a frequency, and the ordinate represents a gain (in decibels (dB)). For example, the equalizer 10 is a band-pass filter, and $|\omega_{p1}|$ and $|\omega_{p2}|$ may be referred to as the lower cut-off frequency and the upper cut-off frequency, respectively, corresponding to the maximum gain. It can be considered that the gain can be in an ascending phase from the frequency $|\omega_z|$ to $|\omega_{p1}|$, until the gain may reach the maximum gain when the frequency is greater than $|\omega_{p1}|$ and less than $|\omega_{p2}|$. Therefore, it can be considered that the zero point $\omega_z$ (determined by $C_0$ and $R_0$) determines a start point of the raised gain, and the two poles $\omega_{p1}$ (determined by $C_0$ and $R_0$) and $\omega_{p2}$ (determined by $R_L$, $R_A$, $C_L$, $C_A$) determine a frequency band in which the maximum gain is located.

As can be seen from the above discussion that, after the to-be-processed signal is input into the equalizer 10, the larger the gain of the signal whose frequency is greater than $|\omega_z|$, the largest the gain of the signal whose frequency is between $|\omega_{p1}|$ and $|\omega_{p2}|$, and the smaller the gain of the signal whose frequency is less than $|\omega_{p2}|$, the content of the signal whose frequency is between $|\omega_{p1}|$ and $|\omega_{p2}|$ in the target signal generated after filtering of the to-be-processed signal by the equalizer 10 is the largest.

It should be noted that the frequency of the signal generated by the wireless router in the external signal is in the vicinity of 2.4G, and the upper cut-off frequency corresponding to the maximum gain of the filter having no cut-off frequency in the source driving chip in the related art is generally 2.2G (close to 2.4G from the left side of 2.4G), which causes a larger interference between the signal output by the filter in the related art and the signal generated by the wireless router.

Based on this, the present disclosure may set the cut-off frequency to at least include adjustment of the upper cut-off frequency of the band-pass filter. It can be seen from the above discussion that the upper cut-off frequency (equal to $|\omega_{p2}|$) of the band-pass filter is determined by $R_L$, $R_A$, $C_L$, and $C_A$. Since the base resistor $R_L$ and the base capacitor $C_L$ are generally not adjustable, $\omega_{p2}$ can be adjusted by adjusting at least one of the adjustable resistor $R_A$ and the adjustable capacitor $C_A$ to reduce an intersection set of the frequency band corresponding to the larger gain in the frequency response curve of the equalizer 10 and the frequency band in which the signal generated by the wireless router is located. Above specific values may be taken as an example, and an appropriate $|\omega_{p2}|$ (less than 2.4G and sufficiently spaced from 2.4G) can be obtained by adjusting at least one of the adjustable resistor $R_A$ and the adjustable capacitor $C_A$. Since most of the signal whose frequency is greater than $|\omega'_{p2}|$ in the to-be-processed signal is filtered out, the signal whose frequency is greater than $|\omega_{p2}|$ in the target signal has a smaller content and the signal whose frequency is close to 2.4G has a smaller content. Therefore, the target signal has less interference with the signal generated by the wireless router.

As shown in FIG. 5, it can be seen from the above discussion that, if the frequency is further reduced from $|\omega_{p2}|$ to $|\omega'_{p2}|$, most of the signal having a frequency greater than $|\omega'_{p2}|$ in the to-be-processed signal are filtered out (more of the signal having a frequency greater than $|\omega_{p2}|$ is filtered out), and the content of the signal having a frequency between $|\omega_{p1}|$ and $|\omega'_{p2}|$ (less than $|\omega_{p2}|$ and further less than 2.4G) in the target signal is maximized, which further increases the distance between the frequency band in which the target signal is located and the frequency band in which the signal generated by the wireless router is located, and further reduces the risk of interference between the target signal and the signal.

Further, an example in which the equalizer 10 is a band pass filter is taken as shown in FIG. 5. When a smaller $|\omega'_{p2}|$ is provided, both $|\omega_{p1}|$ and $|\omega_z|$ may be set less, so that the bandwidth of the frequency response curve of the equalizer 10 can be made consistent with the bandwidth in the related art, thereby avoiding filtering out excessive information in a signal to be adjusted, and ensuring a certain amount of information. Specifically, as shown in Table 1, EQ=0 represents that the equalizer 10 performs only one-fold amplification processing on its current gain (not a gain of 1), DC, FZ, FP1, and FP2 sequentially represent the maximum gain, $|\omega_z|$, $|\omega_{p1}|$, and |ωp2|, and A, F1, F2, and F3 may be sequentially understood as the maximum gain, $|\omega_z|$, $|\omega_{p1}|$, and $|\omega_{p2}|$ before the resistance value of $R_A$ and the capacitance value of $C_A$ are not adjusted in the related art or the present disclosure. In the present embodiment, the $|\omega_{p2}|$ may be reduced from F3 to (F3-0.1) by adjusting at least one of the resistance value of $R_A$ and the capacitance value of $C_A$. Further, the $|\omega_{p1}|$ may be reduced from F2 to (F3-0.2) and the $|\omega_z|$ may also be reduced from F1 to (F1-0.3) by adjusting at least one of the resistance value of $R_0$ and the capacitance value of $C_0$ (the capacitance value of $C_0$ may be adjustable as shown in FIG. 2). In addition, the parameters of the related components in the equalizer 10 may be adjusted to enable the maximum gain to be reduced from A to (A-0.2). As such, the signal amount corresponding to the upper cut-off frequency (F3-0.1) in the target signal may be synchronously reduced, thereby further reducing interference between the target signal and the signal generated by the wireless router.

TABLE 1

| EQ value | Parameters | | |
|---|---|---|---|
| 0 | DC | A | A-0.2 |
| | FZ | F1 | F1-0.3 |
| | FP1 | F2 | F2-0.2 |
| | FP2 | F3 | F3-0.1 |

In some embodiments of the present disclosure, as shown in FIGS. 1 and 2, the source driving chip 100 may further include a logic circuit 20 electrically connected to the adjustable unit 101 and configured to adjust the cutoff frequency by adjusting at least one of a resistance value of the adjustable resistor $R_A$ and a capacitance value of the adjustable capacitor $C_A$ to enable the equalizer 10 to generate the target signal. As can be seen from the above discussion that an adjustment parameter may be changed by adjusting at least one of the resistance value of the adjustable resistor $R_A$ and the capacitance value of the adjustable capacitor $C_A$, thereby reducing the interference between the target signal output by the source driving chip 100 and the current external signal, and improving the reliability of mutual transmission. In the present embodiment of the present disclosure, at least one of the resistance value of the adjustable resistor $R_A$ and the capacitance value of the adjustable capacitor $C_A$ can be adjusted by the logic circuit 20.

Specifically, based on a manner of providing the adjustable capacitor $C_A$ and the adjustable resistor $R_A$ as shown in FIGS. 4 and 5, control terminals of the plurality of sub-resistor switches ($Q_1$ to $Q_4$) and control terminals of the plurality of sub-capacitor switches ($Q_{11}$ to $Q_{44}$) may be electrically connected to the logic circuit 20. The logic circuit 20 may calculate the resistance value of the $R_A$ and the capacitance value of the adjustable capacitor $C_A$ based on required cutoff frequency, and generate a plurality of control signals therefrom, where each of the control signals is used to control turning on or off of the sub-resistor switch (at least one of $Q_1$ to $Q_4$) or the sub-capacitor switch (at least one of $Q_{11}$ to $Q_{44}$), so as to control the sub-constant value resistor ($R_1$, $R_2$, $R_3$ or $R_4$) to be electrically connected to or disconnected from the base resistor $R_L$ or control the sub-constant value capacitor ($C_1$, $C_2$, $C_3$ or $C_4$) to be electrically connected to or disconnected from the base capacitor $C_L$.

The present disclosure may further provide a display module. As shown in FIG. 1, the display module may include: a display panel 300; a timing controller 200 for outputting a to-be-processed signal; and a source driving chip 100 electrically connected between the timing controller 200 and the display panel 300 and including an equalizer 10, where the equalizer 100 is configured to obtain the to-be-processed signal and filter the to-be-processed signal according to a cutoff frequency to output a target signal in the to-be-processed signal, and the source driving chip 100 is configured to drive the display panel 300 for display according to the target signal. As shown in FIG. 2, the equalizer 10 may include an adjustable unit 101 for adjusting the cutoff frequency.

Specifically, the to-be-processed signal may be considered as an initial image signal, which may include grayscale values of a plurality of sub-pixels in each frame in the display panel 300. The source driving chip 100 may further include a data clock recovery circuit 30. The target signal with less noise obtained after the image signal is filtered by the equalizer 10 can be called a target image signal. The data clock recovery circuit 30 may be used to decode the target image signal to obtain a data voltage corresponding to the grayscale value of each of the sub-pixels, and integrate a plurality of data voltages to obtain a plurality of data signals Data respectively transmitted to a plurality of data lines. Each of the data signals Data may be transmitted to respective column of sub-pixels through corresponding one of the data lines, so that each of the data voltages is loaded to the corresponding sub-pixels, thereby sequentially presenting a plurality of frames of pictures.

Therefore, in the present disclosure, the adjustable unit 101 is added to set the cut-off frequency of the equalizer 10 in the source driving chip 100 to be adjustable, so as to adjust the cut-off frequency of the equalizer 10 according to the frequency band (the frequency band with a larger gain) in which the external signal is located, so that the frequency band (the frequency band with a larger gain) in which the above-mentioned data signal output by the equalizer 10 is located and the frequency band in which the current external signal is located may overlap less or even do not overlap, thereby reducing interference of the external signal with the data signal, improving the reliability of the data signal output to the plurality of sub-pixels, and improving the accuracy of the display screen.

The present disclosure provides a source driving chip and a display module, where the equalizer is configured to obtain a to-be-processed signal output from the timing controller and filter the to-be-processed signal according to a cut-off frequency to output a target signal in the to-be-processed signal and the source driving chip is configured to drive the display panel for display according to the target signal, and the equalizer is provided to include an adjustable unit for adjusting the cut-off frequency. Therefore, the cut-off frequency in the equalizer can be adjusted according to a frequency band in which an external signal is located (i.e., a frequency band in which a gain is relatively large), so that a frequency band in which the target signal output from the equalizer is located (a frequency band in which a gain is relatively large) and a frequency band in which a current external signal is located may overlap less, and even not overlap, thereby reducing interference between the target signal output from the source driving chip and the current external signal, and improving reliability of mutual transmission.

The source driving chip and the display module provided in the embodiments of the present disclosure are described in detail above. In this specification, principles and implementations of the present disclosure are illustrated by applying specific examples herein. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A source driving chip for a display module, wherein the display module comprises a display panel and a timing controller, the source driving chip is electrically connected between the timing controller and the display panel, and the source driving chip comprises:

an equalizer for obtaining a to-be-processed signal output from the timing controller and filtering the to-be-processed signal based on a cut-off frequency to output a target signal in the to-be-processed signal, wherein the source driving chip is configured to drive the display panel for display based on the target signal;

wherein the equalizer comprises an adjustable unit for adjusting the cutoff frequency.

2. The source driving chip of claim 1, wherein the equalizer further comprises a base unit electrically connected to the adjustable unit and comprising at least one base resistor and at least one base capacitor; and the adjustable unit comprises at least one adjustable resistor connected in series or parallel with the base resistor and at least one adjustable capacitor connected in series or parallel with the base capacitor.

3. The source driving chip of claim 2, wherein the adjustable resistor is connected in series with the base resistor and comprises a plurality of sub-adjustable resistors connected in series, or the adjustable resistor is connected in parallel with the base resistor and comprises a plurality of sub-adjustable resistors connected in parallel; and the adjustable capacitor is connected in series with the base capacitor and comprises a plurality of sub-adjustable capacitors connected in series, or the adjustable capacitor is connected in parallel with the base capacitor and comprises a plurality of sub-adjustable capacitors connected in parallel.

4. The source driving chip of claim 3, wherein one terminal of the base resistor is loaded with a high voltage signal, another terminal of the base resistor is electrically connected to one terminal of the base capacitor, and another terminal of the base capacitor is grounded.

5. The source driving chip of claim 4, wherein the base unit comprises two base resistors and two base capacitors, and each of the base resistors is connected in series to corresponding one of the base capacitors;

the equalizer further comprises:

a negative feedback resistor;

a first transistor, wherein a gate of the first transistor is configured as a positive input terminal, one of a source and a drain of the first transistor is electrically connected to a base capacitor and a base resistor corresponding to the base capacitor and configured as a negative output terminal, and another of the source and the drain of the first transistor is electrically connected to one terminal of the negative feedback resistor; and a second transistor, wherein a gate of the second transistor is configured as a negative input terminal, one of a source and a drain of the second transistor is electrically connected to another base capacitor and another base resistor corresponding to the another base capacitor and configured as a positive output terminal, and another of the source and the drain of the second transistor is electrically connected to another terminal of the negative feedback resistor;

when a polarity of the to-be-processed signal is positive, the to-be-processed signal is input to the positive input terminal, and the target signal is output from the positive output terminal; and when the polarity of the to-be-processed signal is negative, the to-be-processed signal is input to the negative input terminal, and the target signal is output from the negative output terminal.

6. The source driving chip of claim 3, wherein the equalizer is a band-pass filter and the cut-off frequency comprises at least an upper cut-off frequency of the band-pass filter.

7. The source driving chip of claim 2, wherein the adjustable resistor is connected in parallel with the base resistor and comprises a plurality of resistor branches connected in parallel, each of the resistor branches comprises a sub-constant value resistor and a sub-resistor switch connected in series, and the sub-resistor switch is configured to control the sub-constant value resistor to be electrically connected to or disconnected from the base resistor; and the adjustable capacitor is connected in parallel with the base capacitor and comprises a plurality of capacitor branches connected in parallel, each of the capacitor branches comprises a sub-constant value capacitor and a sub-capacitor switch connected in series, and the sub-capacitor switch is configured to control the sub-constant value capacitor to be electrically connected to or disconnected from the base capacitor.

8. The source driving chip of claim 7, further comprising:

a logic circuit electrically connected to the adjustable unit of the equalizer and configured to adjust the cutoff frequency by adjusting at least one of a resistance value of the adjustable resistor and a capacitance value of the adjustable capacitor to enable the equalizer to generate the target signal.

9. The source driving chip of claim 8, wherein the logic circuit is configured to generate a plurality of control signals, each of the control signals is configured to control corresponding one of sub-resistor switches or corresponding one of sub-capacitor switches to be turned on or turned off, so as to control the sub-constant resistor corresponding to the corresponding sub-resistor switch to be electrically connected to or disconnected from the base resistor corresponding to the corresponding sub-resistor switch or to control the sub-constant capacitor corresponding to the corresponding sub-capacitor switch to be electrically connected to or disconnected from the base capacitor corresponding to the corresponding sub-capacitor switch.

10. The source driving chip of claim 9, wherein one terminal of the base resistor is loaded with a high voltage signal, another terminal of the base resistor is electrically connected to one terminal of the base capacitor, and another terminal of the base capacitor is grounded.

11. The source driving chip of claim 10, wherein the base unit comprises two base resistors and two base capacitors, and each of the base resistors is connected in series to corresponding one of the base capacitors;

the equalizer further comprises:

a negative feedback resistor;

a first transistor, wherein a gate of the first transistor is configured as a positive input terminal, one of a source and a drain of the first transistor is electrically connected to a base capacitor and a base resistor corresponding to the base capacitor and configured as a negative output terminal, and another of the source and the drain of the first transistor is electrically connected to one terminal of the negative feedback resistor; and a second transistor, wherein a gate of the second transistor is configured as a negative input terminal, one of a source and a drain of the second transistor is electrically connected to another base capacitor and another base resistor corresponding to the another base capacitor and configured as a positive output terminal, and another of the source and the drain of the second transistor is electrically connected to another terminal of the negative feedback resistor;

when a polarity of the to-be-processed signal is positive, the to-be-processed signal is input to the positive input terminal, and the target signal is output from the positive output terminal; and when the polarity of the to-be-processed signal is negative, the to-be-processed signal is input to the negative input terminal, and the target signal is output from the negative output terminal.

12. The source driving chip of claim 8, wherein one terminal of the base resistor is loaded with a high voltage signal, another terminal of the base resistor is electrically connected to one terminal of the base capacitor, and another terminal of the base capacitor is grounded.

13. The source driving chip of claim 12, wherein the base unit comprises two base resistors and two base capacitors, and each of the base resistors is connected in series to corresponding one of the base capacitors;

the equalizer further comprises:

a negative feedback resistor;

a first transistor, wherein a gate of the first transistor is configured as a positive input terminal, one of a source and a drain of the first transistor is electrically connected to a base capacitor and a base resistor corresponding to the base capacitor and configured as a negative output terminal, and another of the source and the drain of the first transistor is electrically connected to one terminal of the negative feedback resistor; and a second transistor, wherein a gate of the second transistor is configured as a negative input terminal, one of a source and a drain of the second transistor is electrically connected to another base capacitor and another base resistor corresponding to the another base capacitor and configured as a positive output terminal, and another of the source and the drain of the second transistor is electrically connected to another terminal of the negative feedback resistor;

when a polarity of the to-be-processed signal is positive, the to-be-processed signal is input to the positive input terminal, and the target signal is output from the positive output terminal; and when the polarity of the to-be-processed signal is negative, the to-be-processed signal is input to the negative input terminal, and the target signal is output from the negative output terminal.

14. The source driving chip of claim 7, wherein one terminal of the base resistor is loaded with a high voltage signal, another terminal of the base resistor is electrically connected to one terminal of the base capacitor, and another terminal of the base capacitor is grounded.

15. The source driving chip of claim 14, wherein the base unit comprises two base resistors and two base capacitors, and each of the base resistors is connected in series to corresponding one of the base capacitors;

the equalizer further comprises:

a negative feedback resistor;

a first transistor, wherein a gate of the first transistor is configured as a positive input terminal, one of a source and a drain of the first transistor is electrically connected to a base capacitor and a base resistor corresponding to the base capacitor and configured as a negative output terminal, and another of the source and the drain of the first transistor is electrically connected to one terminal of the negative feedback resistor; and a second transistor, wherein a gate of the second transistor is configured as a negative input terminal, one of a source and a drain of the second transistor is electrically connected to another base capacitor and another base resistor corresponding to the another base capacitor and configured as a positive output terminal, and another of the source and the drain of the second transistor is electrically connected to another terminal of the negative feedback resistor;

when a polarity of the to-be-processed signal is positive, the to-be-processed signal is input to the positive input terminal, and the target signal is output from the positive output terminal; and when the polarity of the to-be-processed signal is negative, the to-be-processed signal is input to the negative input terminal, and the target signal is output from the negative output terminal.

16. The source driving chip of claim 2, wherein one terminal of the base resistor is loaded with a high voltage signal, another terminal of the base resistor is electrically connected to one terminal of the base capacitor, and another terminal of the base capacitor is grounded.

17. The source driving chip of claim 16, wherein the base unit comprises two base resistors and two base capacitors, and each of the base resistors is connected in series to corresponding one of the base capacitors;

the equalizer further comprises:

a negative feedback resistor;

a first transistor, wherein a gate of the first transistor is configured as a positive input terminal, one of a source and a drain of the first transistor is electrically connected to a base capacitor and a base resistor corresponding to the base capacitor and configured as a negative output terminal, and another of the source and the drain of the first transistor is electrically connected to one terminal of the negative feedback resistor; and a second transistor, wherein a gate of the second transistor is configured as a negative input terminal, one of a source and a drain of the second transistor is electrically connected to another base capacitor and another base resistor corresponding to the another base capacitor and configured as a positive output terminal, and another of the source and the drain of the second transistor is electrically connected to another terminal of the negative feedback resistor;

when a polarity of the to-be-processed signal is positive, the to-be-processed signal is input to the positive input terminal, and the target signal is output from the positive output terminal; and when the polarity of the to-be-processed signal is negative, the to-be-processed signal is input to the negative input terminal, and the target signal is output from the negative output terminal.

18. The source driving chip of claim 2, wherein the equalizer is a band-pass filter and the cut-off frequency comprises at least an upper cut-off frequency of the band-pass filter.

19. The source driving chip of claim 1, wherein the equalizer is a band-pass filter and the cut-off frequency comprises at least an upper cut-off frequency of the band-pass filter.

20. A display module, comprising:

a display panel;

a timing controller for outputting a to-be-processed signal; and a source driving chip electrically connected between the timing controller and the display panel and comprising an equalizer, wherein the equalizer is configured to obtain the to-be-processed signal output from the timing controller and filter the to-be-processed signal based on a cut-off frequency to output a target signal in the to-be-processed signal, and the source driving chip is configured to drive the display panel for display based on the target signal;

wherein the equalizer comprises an adjustable unit for adjusting the cutoff frequency.

* * * * *